(12) United States Patent
Petrie

(10) Patent No.: US 10,843,856 B2
(45) Date of Patent: Nov. 24, 2020

(54) OXO-DEGRADABLE RIGID AND FLEXIBLE PACKAGING

(71) Applicant: Hedgehog Group LLC, Irvine, CA (US)

(72) Inventor: Russell Petrie, Irvine, CA (US)

(73) Assignee: Okeanos Group, LLC, Miami Beach, FL (US)

( * ) Notice: Subject to any disclaimer, the term of this patent is extended or adjusted under 35 U.S.C. 154(b) by 154 days.

(21) Appl. No.: 16/004,264

(22) Filed: Jun. 8, 2018

(65) Prior Publication Data

US 2018/0354691 A1 Dec. 13, 2018

Related U.S. Application Data

(60) Provisional application No. 62/517,563, filed on Jun. 9, 2017.

(51) Int. Cl.
| | |
|---|---|
| *B65D 65/46* | (2006.01) |
| *C09C 1/02* | (2006.01) |
| *B65B 31/04* | (2006.01) |
| *B65D 85/80* | (2006.01) |

(52) U.S. Cl.
CPC ............ *B65D 65/466* (2013.01); *B65B 31/04* (2013.01); *B32B 2307/7163* (2013.01); *B32B 2307/7244* (2013.01); *B32B 2323/043* (2013.01); *B32B 2323/046* (2013.01); *B32B 2329/04* (2013.01); *B32B 2367/00* (2013.01); *B32B 2439/70* (2013.01); *B65D 85/80* (2013.01); *B65D 2565/388* (2013.01); *C09C 1/021* (2013.01)

(58) Field of Classification Search
CPC .... B32B 2307/7163; B32B 2307/7244; B32B 2323/043; B32B 2323/046; B32B 2329/04; B32B 2367/00; B32B 2439/70; B65B 31/04; B65D 2565/388; B65D 65/466; B65D 85/80; C09C 1/021; C09C 1/02

See application file for complete search history.

(56) References Cited

U.S. PATENT DOCUMENTS

| | | |
|---|---|---|
| 5,565,503 A | 10/1996 | Garcia et al. |
| 2005/0249899 A1 | 11/2005 | Bonutti |
| 2007/0243350 A1 | 10/2007 | Forsberg et al. |

FOREIGN PATENT DOCUMENTS

WO   WO/2012/088585 A1   7/2012

OTHER PUBLICATIONS

International Search Report and Written Opinion of the International Searching Authority issued in corresponding PCT Application No. PCT/US2018/036775, dated Aug. 30, 2018, 15 pages.

*Primary Examiner* — Yan Lan
(74) *Attorney, Agent, or Firm* — Lewis Roca Rothgerber Christie LLP

(57) ABSTRACT

A container is formed from a composition including: calcium carbonate (CaCO₃); a polymer; and an oxo-degradable additive. The container may be sealed and an interior defined by the container may include a liquid or gas having a concentration of oxygen in a range of 0 volume percent (vol %) to 21 vol %, based on the total volume of the liquid or gas. The container may have a set oxo-biodegradation rate.

20 Claims, No Drawings

OXO-DEGRADABLE RIGID AND FLEXIBLE PACKAGING

CROSS-REFERENCE TO RELATED APPLICATION

This application claims priority to and the benefit of U.S. Provisional Application No. 62/517,563, filed on Jun. 9, 2017, in the U.S. Patent and Trademark Office, the entire content of which is incorporated herein by reference.

BACKGROUND

Currently, a substantial proportion of packaging (e.g., food packaging) in developed countries is made utilizing polymers (e.g., plastics such as petroleum-based plastics). Many of these polymers utilize a limited resource (e.g., petroleum) and do not degrade to a detectable extent under general disposal conditions such as, for example, the conditions present in a landfill. Such plastic containing packaging accumulates in landfills and elsewhere, thereby creating an environmental problem. Currently, a small percentage of plastics are recycled.

Lightweight cardboard and paper are also used for packaging, for example, in packaging used by the food industry. Cardboard and paper are made from trees, which may require substantial amounts of water, time, and space to grow and harvest, thereby rendering cardboard and paper resource intensive. For example, 4 pounds of tree material may be used to make 1 pound of paper products. Further, cardboard and paper have limited suitability for recycling.

Additionally, cardboard is capable of absorbing liquids such as, for example, oil and/or water. For example, the oil from potato chips is absorbed by cardboard, and therefore, cardboard is not desirable for packaging for potato chips. Further, when cardboard absorbs a liquid (e.g., water), the cardboard may quickly lose its strength. Cardboard also cannot be sealed in the manner and/or to the degree to which plastic may be sealed. Thus, cardboard containers are often used with a plastic liner to keep the contents of the container sealed and fresh. For example, cereal boxes often include a plastic liner for sealing the cereal inside of a cardboard container.

SUMMARY

According to embodiments of the disclosure, a container is formed from a composition including: calcium carbonate ($CaCO_3$); a polymer; and an oxo-degradable additive. The container may be included as part of food or non-food packaging. The container may be flexible.

The polymer may include polyethylene (e.g., high-density polyethylene (HDPE), medium-density polyethylene (MDPE), low-density polyethylene (LDPE), and/or linear low-density polyethylene (LLDPE)), polypropylene, polystyrene, polyethylene terephthalate, biodegradable polylactic acid polymer, polyvinyl alcohol, or any combination thereof. The polymer may include a copolymer of any of the polymers disclosed herein and/or a mixture thereof.

The container may be sealed and an interior defined by the container may include a liquid or gas having a concentration of oxygen in a range of 0 volume percent (vol %) to 21 vol %, based on the total volume of the liquid or gas.

The container may be hermetically sealed.

An exterior surface of the container may be substantially free of the oxo-degradable additive.

The container may have a long-term stability of 6 months or more when an interior defined by the container includes a liquid or gas having a concentration of oxygen in a range of 0 volume percent (vol %) to 21 vol %, based on the total volume of the liquid or gas.

The container may oxo-biodegrade in a time period of 45 years or less after an interior defined by the container is exposed to oxygen.

The composition may include the oxo-degradable additive in an amount of 0.01 wt % to 20 wt % (or 0.01 wt % to 10 wt %), based on the total weight of the composition.

The composition may include the polymer in an amount of 5 wt % to 45 wt %, based on the total weight of the composition.

The composition may include the calcium carbonate in an amount of 35 wt % to 94.99 wt %, based on the total weight of the composition.

The container may have a side formed from the composition, and the side may have a thickness of 1 nm to 20.32 cm.

The container may be a food container.

The food container may contain potato chips.

The container may contain a liquid.

The liquid may be chosen from milk, orange juice, and a carbonated beverage.

The container may be a non-food container.

The composition may further include a filler including carbon nanotubes, graphene, cotton, cellulose, a non-nylon fiber, and/or a non-polyester fiber.

The container may include a side including a plurality of layers.

The plurality of layers may include an outer layer facing an exterior of the container and an inner layer facing an interior of the container.

A degradation rate of the outer layer upon exposure to oxygen may be slower than that of the inner layer.

DETAILED DESCRIPTION

In the following detailed description, only certain embodiments of the subject matter of the present disclosure are described, by way of illustration. As those skilled in the art would recognize, the subject matter of the present disclosure may be embodied in many different forms and should not be construed as being limited to the embodiments set forth herein.

Embodiments of the present disclosure are directed toward a container having a set oxo-biodegradation rate. In some embodiments, the container has a set oxo-biodegradation rate upon exposure of an interior of the container to oxygen. The container may be formed from a "paper-like" product including a composition that includes, in part, calcium carbonate ($CaCO_3$), which is an abundant and naturally occurring chemical compound found in limestone. Calcium carbonate is produced by certain marine organisms and is prevalent in the oceans. Due to, at least in part, its natural abundance, calcium carbonate is a relatively inexpensive raw material that is used to prepare industrial products. For example, cement may be prepared using calcium carbonate as a primary component.

Paper-like products have been prepared using calcium carbonate by mixing a small amount (e.g., 20 wt %, based on the total weight of the product) of polymer (e.g., polyethylene or other suitable plastic) with calcium carbonate. Such paper-like products may be referred to as stone paper, rock paper, mineral paper, rich mineral paper, and/or eco paper, among others. Previously, however, these paper-like products included a polymer (e.g., a polyolefin polymer such as polyethylene) that did not quickly degrade (or degrade to a detectable extent) under general disposal conditions. Thus, these paper-like products do not suitably degrade under general disposal conditions, and therefore, contribute to the accumulation of waste and present an environmental problem.

While certain paper-like products have included polymers that degrade when exposed to ultraviolet (UV) light, the degradation slows or halts when the UV light source is removed or covered. Because many waste products end up in locations that are free or substantially free of UV light (e.g., inside of a landfill), such paper-like products often do not degrade under certain disposal conditions, and therefore, contribute to the accumulation of waste and present an environmental problem.

Other paper-like products have replaced the polymer with a plant-based polymer such as a polymer derived from starch (e.g., starch obtained from corn, or any other suitable plant-based source), water, glycerin, and vinegar. Such polymers may be referred to as "bio-plastics." These bio-plastics (e.g., polylactic acid) have been described as being environmentally friendly, because the plant-based polymer may be derived from plants that can be grown commercially and are renewable.

The plant-based polymers may first degrade by way of hydrolysis in the presence of heat and water. Once the plant-based polymers have been cleaved into smaller chains by hydrolysis, the smaller chains of the plant-based polymers may then be secondarily degraded by bacteria. Thus, when the plant-based polymers end up in locations that do not have suitable amounts of heat and water (e.g., landfills in desert regions), the plant-based polymers may not quickly degrade (or degrade to a detectable extent). As such, under certain conditions, paper-like products that include plant-based polymers do not have suitable degradation properties, and therefore, contribute to the accumulation of waste and present an environmental problem.

Accordingly, embodiments of the present disclosure are directed toward a container that oxo-biodegrades at a suitable rate, whether present in a landfill or the ambient environment. For example, the container may have a set oxo-biodegradation rate. In some embodiments, the container has a set oxo-biodegradation rate upon exposure of an interior of the container to oxygen (e.g., upon exposure to air, which includes oxygen). Embodiments of the container are at least partially formed from a composition including calcium carbonate, a polymer, and an oxo-degradable additive. As used throughout this disclosure, including the claims, the term "oxo-degradable additive" may be synonymous with the term "oxo-biodegradable additive." The polymer may be any suitable polymer available in the art. For example, the polymer may include polyethylene (e.g., high density polyethylene (HDPE), medium-density polyethylene (MDPE), low-density polyethylene (LDPE), and/or linear low-density polyethylene (LLDPE)), polypropylene, polystyrene, polyethylene terephthalate, biodegradable polylactic acid polymer, polyvinyl alcohol, or any combination thereof, but the present disclosure is not limited thereto. As used herein, the terms "combination thereof" and "combinations thereof" may refer to a chemical combination (e.g., a copolymer or chemical compound), a mixture, or a laminated structure of components. In some embodiments, the polymer may include a copolymer of any of the polymers disclosed herein and/or a mixture thereof. The composition may further include a filler, such as, for example, any suitable natural fiber. For example, a side of the container and/or the composition may further include a filler including carbon nanotubes (e.g., any suitable carbon nanotubes available in the art), graphene, cotton, cellulose (e.g., nanocellulose), a non-nylon fiber, a non-polyester fiber, and/or the like.

The oxo-degradable additive increases the rate at which the polymer oxo-degrades when exposed to oxygen. For example, the oxo-degradable additive may increase the rate at which the polymer is oxidized. The polymer may breakdown when exposed to oxygen without the need for bacteria microbes to initially break down the polymer. After (or concurrently or simultaneously with) the oxidation of the polymer, organisms (e.g., microbes, bacteria and/or the like) may further degrade the remaining portions of the polymer. This process may be referred to as oxo-biodegradation. Thus, the oxo-degradable additive causes the polymer to oxo-biodegrade.

The oxo-degradable additives according to embodiments of the present disclosure and/or the resultant oxo-biodegradation byproducts (e.g., breakdown products) may be non-toxic to humans and/or the marine environment. The breakdown products may be ingested by micro-organisms and thereby be re-incorporated into the biological world. Unlike "bio-plastics," the oxo-degradable additives cause the oxo-biodegradation of the polymer even without the presence of water. For example, the polymer may be oxo-biodegraded in the presence of the oxo-degradable additive and oxygen even when water is substantially not present (e.g., water is present, if at all, as an incidental impurity).

The oxo-degradable additive may include any suitable additive that increases the rate at which the polymer is oxidized or oxo-biodegraded. The additive may include any non-heavy metal additive or salt that complies with European Union Packaging Waste Directive 94/62, Article 11 and similar U.S. laws and/or regulations. In some embodiments, the oxo-degradable additive includes a salt such as, for example, a cadmium salt and/or a non-heavy metal salt, but the present disclosure is not limited thereto. As used herein, the term "heavy metal" may refer to those elements that are restricted under European Union Packaging Waste Directive 94/62, Article 11. Non-limiting, non-heavy metal, commercially available examples of the oxo-degradable additive include those available from Willow Ridge Plastics Inc. (Erlanger, Ky.) and/or Bio-Tec Environmental, LLC (Cedar Crest, N. Mex.).

Because oxygen is present in many locations on Earth, the container may be oxo-biodegraded almost anywhere in the world. While the present application is not limited by any particular mechanism or theory, it is believed that the oxo-biodegradation may proceed according to a two-step process having an initial phase of oxidation that breaks down the plastic/polymer, thereby reducing the structural integrity of the plastic/polymer. For example, the oxidation process of the initial phase may change the initial structural characteristics of the plastic/polymer by a fragmentation process. The break down products resulting from the initial phase of the oxidation may have a molecular weight of about 5,000 to about 10,000 kilodaltons (kDa). The break down products may then be ingested and used by bacteria resulting in biological incorporation of the break down products of the plastic/polymer. The rate of the oxidation of the plastic/polymer may depend on the temperature and/or the amount of incident ultraviolet radiation. The rate of the bacterial break-down process may also be temperature dependent. Due to the presence of the oxo-degradable additive, in some embodiments, the oxo-biodegradation of the container may be relatively temperature insensitive and/or the oxo-biodegradation of the container may proceed at low temperatures (e.g., temperatures below 50° C., below 45° C., below 40° C., below 35° C., below 30° C., below 25° C., and/or above 0° C., above 5° C., above 10° C., above 15° C., or in any sub-range subsumed therein). Oxo-biodegrading the polymer reduces the structural integrity of the container and increases the rate at which the container oxo-biodegrades.

In some embodiments, the container may be sealed from the outside environment and an interior defined by the container may include a liquid or gas having a concentration of oxygen in a range of 0 volume percent (vol %) to 21 vol %, based on the total volume of the liquid or gas. In some embodiments, the liquid or gas may be substantially or completely free of oxygen, or the liquid or gas may have a concentration of oxygen sufficiently low (e.g., 0 vol % to 10 vol %, 0 vol % to 9 vol %, 0 vol % to 8 vol %, 0 vol % to 7 vol %, 0 vol % to 6 vol %, 0 vol % to 5 vol %, 0 vol % to 4 vol %, 0 vol % to 3 vol %, 0 vol % to 2 vol %, or 0 vol % to 1 vol %) such that the oxo-biodegradation of the polymer does not proceed at a detectable rate when the container is sealed. For example, the oxo-degradable additive may be located at an interior surface of the container and exterior surfaces of the container may be substantially or completely free of the oxo-degradable additive such that oxo-biodegradation of the container substantially does not proceed when the container is sealed. When the container is opened, the interior of the container is exposed to oxygen and the oxo-biodegradation of the container begins (or the rate of the oxo-biodegradation substantially increases). The present disclosure, however, is not limited to a container having exterior surfaces that are substantially or completely free of the oxo-degradable additive. Instead, the container may have any suitable concentration of the oxo-degradable additive at exterior surfaces of the container. For example, the concentration of the oxo-degradable at an exterior surface may be greater than or equal to that at an interior surface of the container.

As used, herein the term "substantially free" indicates that the referenced component is present, if at all, as an incidental impurity. For example, an interior of a container that is substantially free of oxygen includes oxygen, if at all, as an incidental impurity. Similarly, an exterior surface of a container that is substantially free of the oxo-degradable additive may include the oxo-degradable additive, if at all, as an incidental impurity.

By having an interior that is substantially or completely free of oxygen and an exterior surface that is substantially or completely free of the oxo-degradable additive, the container may be formed to have long-term stability (e.g., a shelf life of 6 months or more, one year or more, 18 months or more, 2 years or more, 10 years or more, or in any sub-range subsumed therein) and be able to rapidly degrade (e.g., decompose) when opened and exposed to oxygen (e.g., in the form of ambient air including oxygen). Further, the container may be designed to degrade over a set period of time. The container may be designed to degrade over any suitable time frame. For example, the container may be designed to oxo-biodegrade (e.g., substantially or completely oxo-biodegrade) before or after the interior of the container is exposed to oxygen (e.g., exposed to the ambient atmosphere) in a time period of less than or equal to 45 years, less than or equal to 40 years, less than or equal to 30 years, less than or equal to 20 years, less than or equal to 10 years, less than or equal to one year, less than or equal to 11 months, less than or equal to 10 months, less than or equal to 9 months, less than or equal to 8 months, less than or equal to 7 months, less than or equal to 6 months, less than or equal to 5 months, less than or equal to 4 months, less than or equal to 3 months, less than or equal to 2 months, less than or equal to 1 month, less than or equal to 3 weeks, less than or equal to 2 weeks, or in any sub-range subsumed therein. In some embodiments, the container may degrade (either before or after the interior of the container has been exposed to the ambient atmosphere) in a time period of 2 to 5 years, or less. The time period of oxo-biodegradation may be with respect to oxo-biodegradation that occurs in the ambient environment or under standard landfill conditions.

The time period over which the container oxo-biodegrades upon exposure of the interior to oxygen may be controlled according to the concentration of the calcium carbonate, the polymer, and/or the oxo-degradable additive in the composition. For example, increasing the amount of the oxo-degradable additive increases the rate at which the container oxo-biodegrades after exposure of the interior of the container to oxygen and decreases the time period over which the oxo-biodegradation occurs. In some embodiments, the composition includes the oxo-degradable additive in an amount of 0.01 wt % to 20 wt %, 0.01 wt % to 10 wt %, 0.01 wt % to 3 wt %, 0.01 wt % to 2 wt %, 2 wt % to 10 wt %, 3 wt % to 10 wt %, 4 wt % to 10 wt %, 5 wt % to 10 wt %, or any sub-range subsumed therein, based on the total weight of the composition. Further, the composition may include the polymer in an amount of 5 wt % to 45 wt %, 5 wt % to 40 wt %, 5 wt % to 30 wt %, 10 wt % to 30 wt %, 10 wt % to 25 wt %, 15 wt % to 20 wt %, or any sub-range subsumed therein, based on the total weight of the material of the composition. The composition may include the calcium carbonate in an amount of 35 wt % to 94.99 wt %, 40 wt % to 94.99 wt %, 60 wt % to 94.99 wt %, 60 wt % to 90 wt %, 70 wt % to 90 wt %, 75 wt %, or any sub-range subsumed therein, based on the total weight of the material of the composition.

In addition to having the oxo-degradable additive at the interior surface of the container, the container may also include the oxo-degradable additive in the bulk material of the container, while still having an exterior surface that is substantially or completely free of the oxo-degradable additive. In some embodiments, the concentration of the oxo-degradable additive may vary along a concentration gradient. For example, the concentration of the oxo-degradable additive may be highest at the interior surface and decrease along a thickness of a wall of the container until the concentration of the oxo-degradable additive is substantially zero at the exterior surface of the wall.

The container may include a side (e.g., a plurality of sides), top, and/or bottom formed from the composition. In some embodiments, the container has two sides facing each other and sealed at their respective edges. The side, top, and/or bottom may have any suitable thickness. In some embodiments, the side, top, and/or bottom of the container may have a thickness thicker than that of "stone paper." For example, a side (or each of the sides), top, and/or bottom of the container may have a thickness of 1 nm to 20.32 cm (8 inches), 1 nm to 100 nm, 1 nm to 50 nm, 1 nm to 20 nm, 4 nm to 20.32 cm (8 inches), 0.001 mm (1 μm) to 20.32 cm (8 inches), 0.001 mm (1 μm) to 15.24 cm (6 inches), 0.001 mm (1 μm) to 10.16 cm (4 inches), 0.001 mm to 30 mm, 0.254 mm (0.01 inch) to 12.7 mm (0.5 inch), 0.7 mm (700 micron) to 12.7 mm, 1 mm to 12.7 mm, 1 mm to 6.35 mm, 2 mm to 6.35 mm, or any sub-range subsumed therein. By having a side, top, and/or bottom having a thickness within a suitable range, the side, top, and/or bottom may be substantially rigid, thereby providing the side, top, and/or bottom with strength. In some embodiments, the side, top, and/or bottom of the container may have a suitable thickness and rigidity such that a plurality of the containers may be stacked on one another (e.g., the containers are not easily crushed). In some embodiments, a surface of the side, top, and/or bottom of the container is relatively easy and inexpensive to print on. For example, each of the side, top, and/or bottom may have a substantially flat surface configured to be printed on.

The side, top, and/or bottom of the container may include a plurality of layers. Each of the layers may independently have any suitable thickness such as, for example, 1 nm to 20.32 cm (8 inches) or any range subsumed therein. The layers may have different compositions relative to one another such that the layers have different rates of degradation (e.g., oxo-degradation upon exposure of oxygen) relative to one another. For example, the amount of calcium carbonate, polymer, and oxo-degradable additive may vary from layer to layer such that the layers have different rates of oxidation.

In some embodiments, the container includes an outer layer facing toward the exterior of the container and an inner layer facing toward the interior of the container, where the outer layer has a rate of degradation (e.g., oxo-degradation upon exposure to oxygen) that is slower than that of the inner layer. The rates of degradation of the inner and outer layers may vary as a result in differences in the composition of the inner and outer layers (e.g., as a result of differences in the amounts of calcium carbonate, polymer, and/or oxo-degradable additive in the respective layers).

The layers may be formed by, for example, extruding a layer (e.g., the outer layer or inner layer), annealing the layer, extruding another layer on the layer (e.g., the other of the outer layer or inner layer), and annealing the other layer. Additional layers having degradation that are the same as or different from the outer layer or inner layer may be present between the outer layer and inner layer. For example, the side, top, and/or bottom of the container may include 3 to 5 layers.

Embodiments of the present disclosure may have features of having a substantially rigid side, having a surface that is relatively easy and inexpensive to print on, being substantially waterproof, being substantially airtight (or being hermetically sealed), and/or being capable of containing a liquid. In other embodiments, the container may be flexible. For example, a side (e.g., a plurality of sides), top, and/or bottom of the container may be flexible.

Embodiments of the container are not limited to a particular application. In some embodiments, the container may be a food or a non-food container. For example, the food container may contain potato chips. In some embodiments, the food container is waterproof and/or substantially airtight (e.g., hermetically sealed). For example, the food container may contain a liquid such as, for example, milk, orange juice, carbonated beverage, or the like.

Spatially relative terms, such as "beneath," "below," "lower," "under," "above," "upper," and the like, may be used herein for ease of explanation to describe one element or feature's relationship to another element(s) or feature(s). It will be understood that the spatially relative terms are intended to encompass different orientations of the device in use or in operation. For example, if the device is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with certain embodiments, it is to be understood that the subject matter of the present disclosure is not limited to the disclosed embodiments, but, on the contrary, the present disclosure is intended to cover various modifications and equivalent arrangements included within the spirit and scope of the appended claims, and equivalents thereof.

What is claimed is:

1. A container formed from a composition comprising:
   calcium carbonate ($CaCO_3$);

a polymer; and an oxo-degradable additive, wherein the container comprises a side comprising at least one layer formed from the composition, and wherein the oxo-degradable additive in said at least one layer of the side has a concentration that varies along a concentration gradient.

2. The container of claim 1, wherein the polymer comprises polyethylene, polypropylene, polystyrene, polyethylene terephthalate, biodegradable polylactic acid polymer, polyvinyl alcohol, or any combination thereof.

3. The container of claim 1, wherein the container is sealed and an interior defined by the container comprises a liquid or gas having a concentration of oxygen in a range of 0 volume percent (vol %) to 21 vol %, based on the total volume of the liquid or gas.

4. The container of claim 3, wherein the container is hermetically sealed.

5. The container of claim 1, wherein an exterior surface of the container is substantially free of the oxo-degradable additive.

6. The container of claim 1, wherein the container has a long-term stability of 6 months or more when an interior defined by the container comprises a liquid or gas having a concentration of oxygen in a range of 0 volume percent (vol %) to 21 vol %, based on the total volume of the liquid or gas.

7. The container of claim 1, wherein the container oxo-biodegrades in a time period of 45 years or less.

8. The container of claim 1, wherein the composition comprises the oxo-degradable additive in an amount of 0.01 wt % to 20 wt %, based on the total weight of the composition.

9. The container of claim 1, wherein the composition comprises the polymer in an amount of 5 wt % to 45 wt %, based on the total weight of the composition.

10. The container of claim 1, wherein the composition comprises the calcium carbonate in an amount of 35 wt % to 94.99 wt %, based on the total weight of the composition.

11. The container of claim 1, wherein the container has a side formed from the composition, and the side has a thickness of 1 nm to 20.32 cm.

12. The container of claim 1, wherein the container is a food container.

13. The food container of claim 12, wherein the food container contains potato chips.

14. The container of claim 1, wherein the container contains a liquid.

15. The container of claim 14, wherein the liquid is chosen from milk, orange juice, and a carbonated beverage.

16. The container of claim 1, wherein the container is a non-food container.

17. The container of claim 1, wherein the composition further comprises a filler comprising carbon nanotubes, graphene, cotton, cellulose, a non-nylon fiber, and/or a non-polyester fiber.

18. The container of claim 1, wherein the side comprises a plurality of layers.

19. The container of claim 18, wherein the plurality of layers comprises an outer layer facing an exterior of the container and an inner layer facing an interior of the container, and wherein at least one of the outer layer and the inner layer is the at least one layer formed from the composition.

20. The container of claim 19, wherein a degradation rate of the outer layer upon exposure to oxygen is slower than that of the inner layer.

* * * * *